US012627253B2

(12) United States Patent
Wang et al.

(10) Patent No.:　US 12,627,253 B2
(45) Date of Patent:　May 12, 2026

(54) MULTI-BRANCH FIXED OFFSHORE PHOTOVOLTAIC STRUCTURE WITH AUTOMATIC PITCH ADJUSTMENT

(71) Applicant: PowerChina Huadong Engineering Corporation Limited, Hangzhou (CN)

(72) Inventors: Bin Wang, Hangzhou (CN); Shan Gao, Hangzhou (CN); Dezhi Wang, Hangzhou (CN); Gang Wang, Hangzhou (CN); Xiudi Ren, Hangzhou (CN)

(73) Assignee: PowerChina Huadong Engineer g Corporation Limited, Hangzhou (CN)

( * ) Notice: Subject to any disclaimer, the term of this patent is extended or adjusted under 35 U.S.C. 154(b) by 173 days.

(21) Appl. No.: 18/415,483

(22) Filed: Jan. 17, 2024

(65) Prior Publication Data

US 2024/0348195 A1　　Oct. 17, 2024

(30) Foreign Application Priority Data

Jan. 17, 2023　(CN) .......................... 202310091452.4

(51) Int. Cl.
　　*H02S 20/32*　　(2014.01)
　　*H02J 3/38*　　(2006.01)
　　*H02J 7/35*　　(2006.01)
　　*H02S 10/20*　　(2014.01)
(52) U.S. Cl.
　　CPC .............. *H02S 20/32* (2014.12); *H02J 3/381* (2013.01); *H02J 7/35* (2013.01); *H02J 2300/24* (2020.01); *H02S 10/20* (2014.12)
(58) Field of Classification Search
　　CPC ..................................................... H02S 20/32
　　See application file for complete search history.

(56) References Cited

U.S. PATENT DOCUMENTS

2009/0267347 A1 * 10/2009 Abatemarco ........... F03B 13/10
　　　　　　　　　　　　　　　　　　　　290/43
2018/0354591 A1 * 12/2018 Burt .................... F03B 13/1845

FOREIGN PATENT DOCUMENTS

CN　　　　101882895　A　　11/2010
CN　　　　108173501　A　*　6/2018 ............. H02S 10/12
CN　　　　106817072　B　　8/2018
CN　　　　115520337　A　　12/2022

OTHER PUBLICATIONS

English machine translation of CN108173501A. (Year: 2018).*

* cited by examiner

*Primary Examiner* — Lindsey A Buck

(57)　　　　　　ABSTRACT

A multi-branch fixed offshore photovoltaic (PV) structure with automatic pitch adjustment includes a fixed base, a multi-branch integrated tower, and a PV device. The fixed base includes an upper section, a middle section and a lower section arranged in the seabed. The upper section is above the sea level and connected to the multi-branch integrated tower. The multi-branch integrated tower includes a main tower body and multiple pitch-regulating frames rotatably connected to the main tower body. The main tower body is provided with a control and energy storage system to drive the pitch-regulating frames to rotate. The PV device is fixed to the pitch-regulating frames. The main body is provided with a sunlight monitoring system to monitor solar orientation and inclination angle of a sunlight relative to the PV device. The sunlight monitoring system is connected to the control and energy storage system.

10 Claims, 7 Drawing Sheets

MULTI-BRANCH FIXED OFFSHORE PHOTOVOLTAIC STRUCTURE WITH AUTOMATIC PITCH ADJUSTMENT

CROSS-REFERENCE TO RELATED APPLICATIONS

This application claims the benefit of priority from Chinese Patent Application No. 202310091452.4, filed on Jan. 17, 2023. The content of the aforementioned application, including any intervening amendments thereto, is incorporated herein by reference in its entirety.

TECHNICAL FIELD

This application relates to offshore photovoltaic power generation, and more particularly to a multi-branch fixed offshore photovoltaic (PV) structure with automatic pitch adjustment.

BACKGROUND

With the continuous development of photovoltaic (PV) industry, land-based PV and water-based PV (such as in lakes, reservoirs, rivers, shoals, and bays) systems have become increasingly mature. Traditional land-based PV power stations occupy a large area, resulting in the waste of land, especially arable land. Therefore, the emerging water-based photovoltaic power stations with less land resources consumption have attracted considerable attention. Compared with lakes and reservoirs, seas are much broader in area, and the offshore PV power generation exhibits a promising prospect.

The offshore PV includes offshore fixed pile-based PV and floating offshore PV. For a shallow water area with smaller water level changes and relatively stable underwater geological composition, the pile-based fixed offshore PV is preferable compared to the floating offshore PV due to the lower construction cost. At present, the pile-based offshore PV foundation generally adopts high-strength prestressed concrete piles with low structural strength and small load-bearing capacity, which are only suitable for shallow water areas. While the floating offshore PV is mainly used in the waters protected by anti-wave measures. The floating structure is made of high-strength polyethylene (HDPE) by blow molding. The floating structure is of a shallow draught and a low freeboard, which is only suited to sea area with wave heights of less than 1 m, to prevent the wave from attacking the PV modules.

Traditional prestressed concrete pipe pile-based offshore PV and floating HDPE PV structures have poor applicability due to their unsatisfactory ability to withstand harsh sea conditions. The pipe piles have low strength, and the number of PV panels supported by each pipe pile is very small, resulting in poor utilization efficiency of the piles. The floating HDPE PV requires the floating breakwaters to dissipate the waves, which will lead to a sharp increase in costs. In addition, such two types of PV structures cannot adjust the angle according to the sun orientation, resulting in low power generation efficiency.

SUMMARY

In view of the deficiencies of low utilization efficiency of pipe piles and poor power generation efficiency in the prior art, this application provides a multi-branch fixed offshore photovoltaic (PV) structure with automatic pitch adjustment, which can adjust the angle according to the sun orientation, so as to maximally receive the sunlight and improve the power generation efficiency. Moreover, a multi-branch integrated tower structure is adopted on which a plurality of PV panels are arranged, so as to improve the utilization rate of pipe piles.

Technical solutions of this application are described as follows.

This application provides a multi-branch fixed offshore photovoltaic (PV) structure with automatic pitch adjustment, comprising:

a fixed base;

a multi-branch integrated tower;

a sunlight monitoring system;

a PV device; and a control and energy storage system;

wherein the fixed base comprises an upper section, a middle section, and a lower section connected in sequence; the lower section is configured for arrangement in a seabed; and an end of the upper section away from the middle section is connected to the multi-branch integrated tower through a counter flange;

the multi-branch integrated tower comprises a main tower body and a plurality of pitch-regulating frames; the plurality of pitch-regulating frames is rotatably provided on the main tower body; the main tower body comprises a rotating tower portion and a fixed tower portion; the rotating tower portion is rotatably provided on an upper portion of the fixed tower portion; the fixed tower portion is connected to the upper section of the fixed base through the counter flange;

the sunlight monitoring system is provided on the rotating tower portion for monitoring a solar orientation and an inclination angle of sunlight relative to the main tower body;

each of the plurality of pitch-regulating frames is fixedly provided with the PV device; the PV device is integrated with a light-sensing device, and the light-sensing device is configured to monitor an illumination area and an illumination intensity on the PV device; and the control and energy storage system is provided in the fixed tower portion; the main tower body, the plurality of pitch-regulating frames, the sunlight monitoring system, and the light-sensing device are all in signal connection with the control and energy storage system; the control and energy storage system is in wire or wireless communication with the sunlight monitoring system and the light-sensing device for data transmission; and the control and energy storage system is configured to control the rotating tower portion to perform axial rotation relative to the fixed tower portion, and to control each of the plurality of pitch-regulating frames to rotate relative to the main tower body, so as to adjust an angle of the PV device.

In an embodiment, each of the plurality of pitch-regulating frames comprises a bearing motor, a spindle rotary plate, and a main beam; and the bearing motor is provided with a motor spindle which is connected to the spindle rotary plate; the spindle rotary plate is connected to the main beam; the PV device is fixedly provided on the main beam; the bearing motor is in signal connection with the control and energy storage system; and the control and energy storage system is configured to control the motor spindle of the bearing motor to rotate, so as to make the spindle rotary plate drive the main beam to rotate relative to the fixed tower portion, thereby adjusting the angle of the PV device.

In an embodiment, each of the plurality of pitch-regulating frames further comprises a support bearing, a connecting bolt, and an inner platform; the bearing motor is mounted on the inner platform; the spindle rotary plate is connected to the main beam through the connecting bolt; and both the support bearing and the inner platform are connected to the main tower body.

In an embodiment, the middle section is a variable-diameter section; a cross-section of the middle section is circular; and a radius of the cross-section of the middle section decreases progressively from an end of the middle section connected with the lower section to an end of the middle section connected with the upper section.

In an embodiment, the middle section is provided with a sacrificial anode block, or an outer periphery of the fixed base is coated with an anti-corrosion coating.

In an embodiment, the PV device is connected to an external power grid via a submarine cable; the PV device is configured to generate and transmit electricity to the external power grid via the submarine cable; and the submarine cable is sleevedly provided with a protection sleeve.

In an embodiment, the counter flange comprises a first flange plate and a second flange plate; the first flange plate is fixedly connected to the upper section; the second flange plate is fixedly connected to the fixed tower portion; the first flange plate is connected to the second flange plate, so as to connect the fixed tower portion to the upper section.

In an embodiment, the main tower body further comprises a rotating platform through which the rotating tower portion is connected to the fixed tower portion; and the rotating platform comprises a rotating bearing, a first bolt and a second bolt; the rotating bearing comprises an inner ring, an outer ring, and a ball rolling element provided between the inner ring and the outer ring; the ball rolling element is configured to enable relative rotation between the inner ring and the outer ring; the outer ring is connected to the rotating tower portion through the first bolt; the inner ring is connected to the fixed tower portion through the second bolt, so as to realize a rotational connection between the rotating tower portion and the fixed tower portion.

In an embodiment, the control and energy storage system is provided in the main tower body; the rotating platform further comprises a rotating motor which is fixedly connected to the rotating tower portion; a first meshing tooth is provided on an outer periphery of a rotating shaft of the rotating motor; a second meshing tooth is provided on an inner side of the inner ring; the rotating motor is engaged with the inner ring through the first meshing tooth and the second meshing tooth to drive the rotating shaft of the rotating motor to rotate, so as to drive the rotating tower portion to rotate relative to the fixed tower portion; and the control and energy storage system is in signal connection with the rotating motor to control the rotating motor to rotate.

In an embodiment, the control and energy storage system comprises a control unit and an energy storage unit; the rotating motor, each of the plurality of pitch-regulating frames, the sunlight monitoring system, and the light-sensing device are in signal connection with the control unit; the PV device is electrically connected to the energy storage unit; the PV device is configured to charge the energy storage unit; and the energy storage unit is configured to power the control unit, the rotating motor and the plurality of pitch-regulating frames.

In an embodiment, the PV device is configured to send power to a power grid through a submarine cable after the energy storage unit is fully charged.

In an embodiment, the main tower body is provided with an inner platform at a point connected to the pitch-regulating frame; the inner platform is provided with the bearing motor, which is connected to the main beam of the pitch-regulating frame, thereby realizing the rotation of the pitch-regulating frame within 0-90 degrees.

In an embodiment, the main tower body is provided with a rotating platform between a bottom counter flange and the first pitch-regulating frame, which can realize the rotation of an upper part of the main tower body through the motor and gear transmission. The rotating platform enables the rotating tower portion of the main tower body to rotate 180 degrees in the horizontal plane.

In an embodiment, the control unit can control the pitch adjustment of the pitch-regulating frames and the rotation of the rotating platform based on the light area and intensity fed back by each PV device and the solar orientation and solar inclination fed back by the sunlight monitoring system.

In an embodiment, the control unit controls the pitch-regulating frame and the rotating platform based on the following guidelines.

1. The rotating platform is preferentially controlled according to the solar orientation fed back from the sunlight monitoring system, to ensure that the photovoltaic device is facing the solar orientation.
2. After ensuring that the PV device is facing the solar orientation, the angle of the pitch-regulating frame is adjusted to optimize the illumination area received by all the photovoltaic devices.

In the event of a typhoon or storm, the control unit can control the pitch-regulating frame and the rotating platform to ensure that the PV devices are propelled into the wind, thereby reducing the wind area and the wind load, and protecting the PV devices and improving the stability of the entire structures.

In an embodiment, a plurality of rotating platforms are provided at different elevations of the main tower body and divided the main tower body into a plurality of segments, so as to independently control the rotation of each segment, thereby reducing the solar shading between the PV devices at different elevations.

In an embodiment, the fixed base is connected to the multi-branch integrated tower by a counter flange. During construction on the sea, the fixing base is first installed by piling, and then the multi-branch integrated tower is lifted.

This application has the following beneficial effects.

(1) The multi-branch fixed offshore photovoltaic structure with automatic pitch adjustment in this application is applicable to a wide range of sea conditions and can resist harsh and complex environments such as large wave heights, large current speeds, and sea ice.

(2) The support structure has high utilization efficiency and reduces the project cost. The multi-branch arrangement, control unit, rotating platform, and pitching device can effectively solve the shading problem and power generation efficiency problem among the PV devices.

(3) In winter, the rotation of the branch pitches can shake off the snow and reduce the operation and maintenance work caused by snow accumulation on photovoltaic devices.

(4) The rotation of the main tower body and the rotation of the pitch-regulating frames allow the whole PV system to achieve overall 360-degree attitude adjustment, which can effectively improve the power generation efficiency in each period. Each pitch-regulating frame is adjusted independently, and the overall optimization algorithm is also used to achieve the overall optimal power generation efficiency.

(5) In the case of typhoons and storms, the rotation of the main tower body and the rotation of the pitch-regulating frames can effectively reduce the wind area of the PV devices, reduce the wind load, and improve the safety of the overall structure.

(6) The construction process is simple, which can effectively reduce the construction cost and shorten the construction period.

(7) The sunlight monitoring system can effectively monitor the sun orientation, and then allow the control unit to adjust the orientation and angle of the PV device.

BRIEF DESCRIPTION OF THE DRAWINGS

The present disclosure will be further described below in conjunction with the accompanying drawings.

In the figures.

1, fixed base; 1-1, upper section; 1-2, middle section; 1-3, lower section; 1-5, sacrificial anode block; 2, multi-branch integrated tower; 2-1-1, main tower body; 2-1-1, rotating tower portion; 2-1-2, fixed tower portion; 2-1-3, first inner platform; 2-2, pitch-regulating frame; 2-2-1, bearing motor; 2-2-2, motor spindle; 2-2-3, spindle rotary plate; 2-2-4, support bearing; 2-2-5, connecting bolt; 2-2-6, main beam; 2-2-7, second inner platform; 2-4, rotating platform; 2-4-1, rotating bearing; 2-4-1-1, inner ring; 2-4-1-2, outer ring; 2-4-1-3, ball rolling element; 2-4-1-4, second meshing tooth; 2-4-2, bolt; 2-4-3, rotating motor; 2-4-3-1, rotating shaft; 2-4-3-2, first meshing tooth; 3, sunlight monitoring system; 3-1, wire pipe; 4, photovoltaic device; 5, control and energy storage system; 5-1, control unit; 5-2, energy storage unit; 6, protection sleeve; 7, counter flange; 7-1, first flange plate; 7-2, second flange plate; and 8, submarine cable.

DETAILED DESCRIPTION OF EMBODIMENTS

Figure 1:
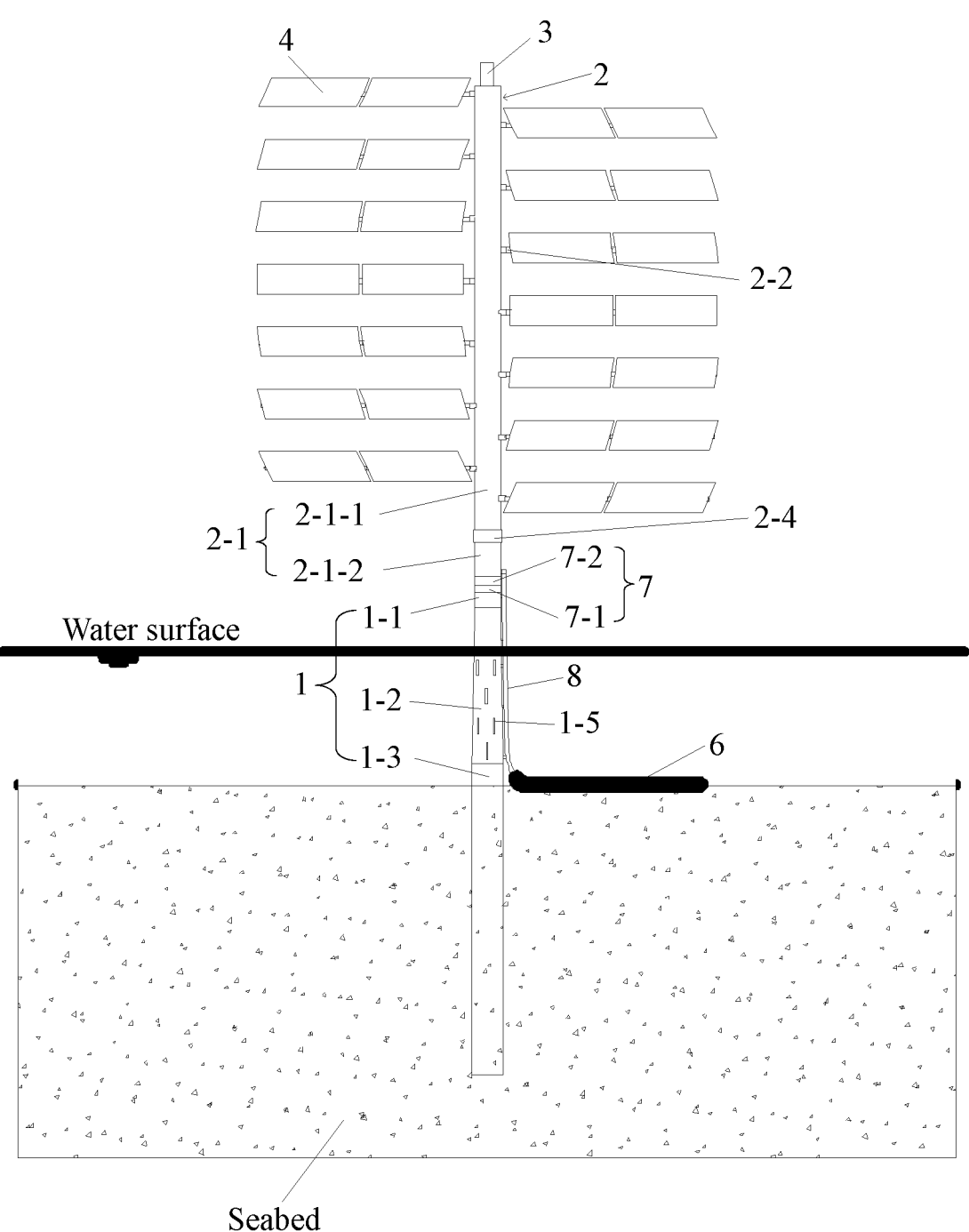
FIG. 1 is a front view of a multi-branch fixed offshore photovoltaic structure with automatic pitch adjustment according to one embodiment of the present disclosure.
Figure 2:
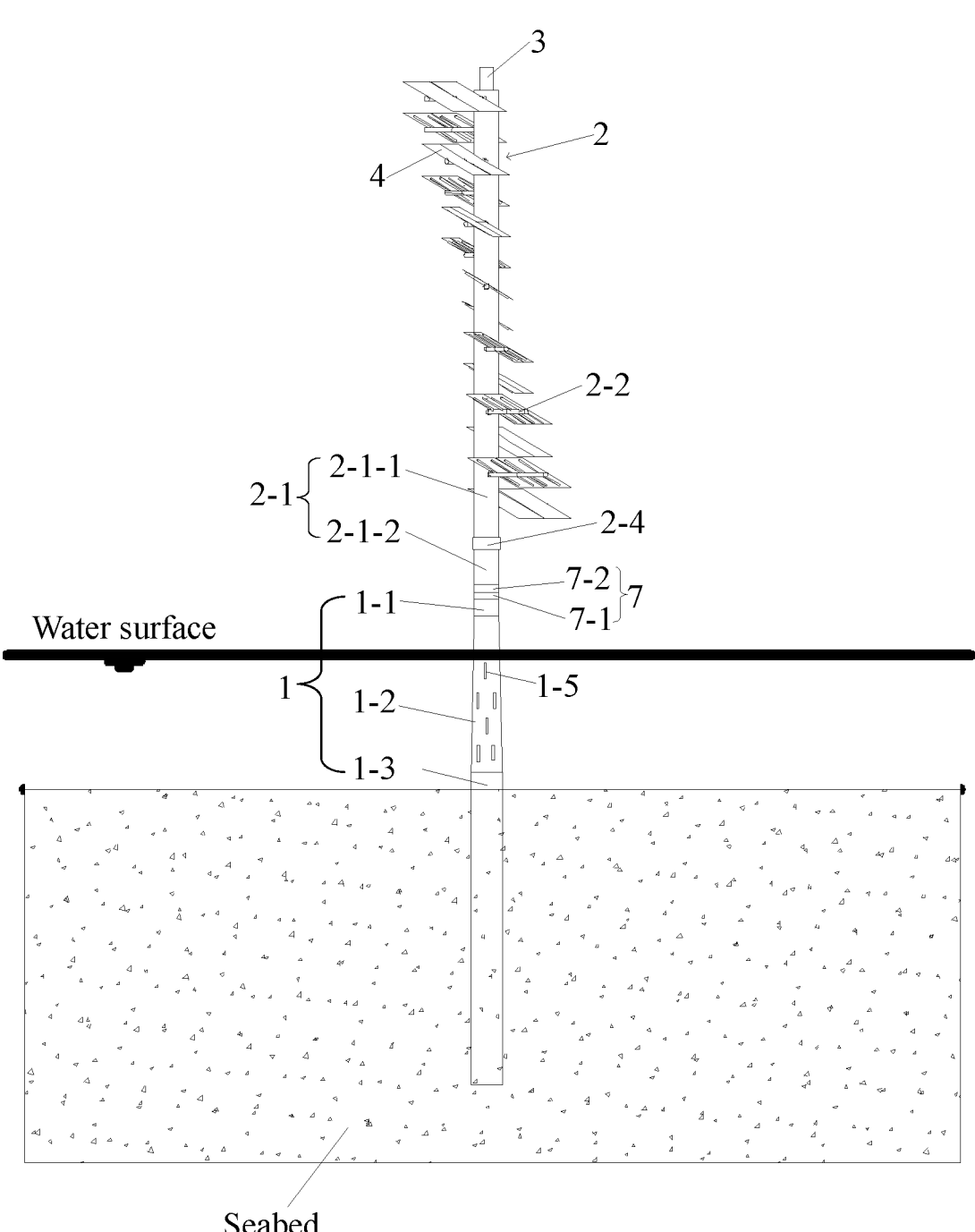
FIG. 2 is a side view of the multi-branch fixed offshore photovoltaic structure according to one embodiment of the present disclosure.
Figure 3:
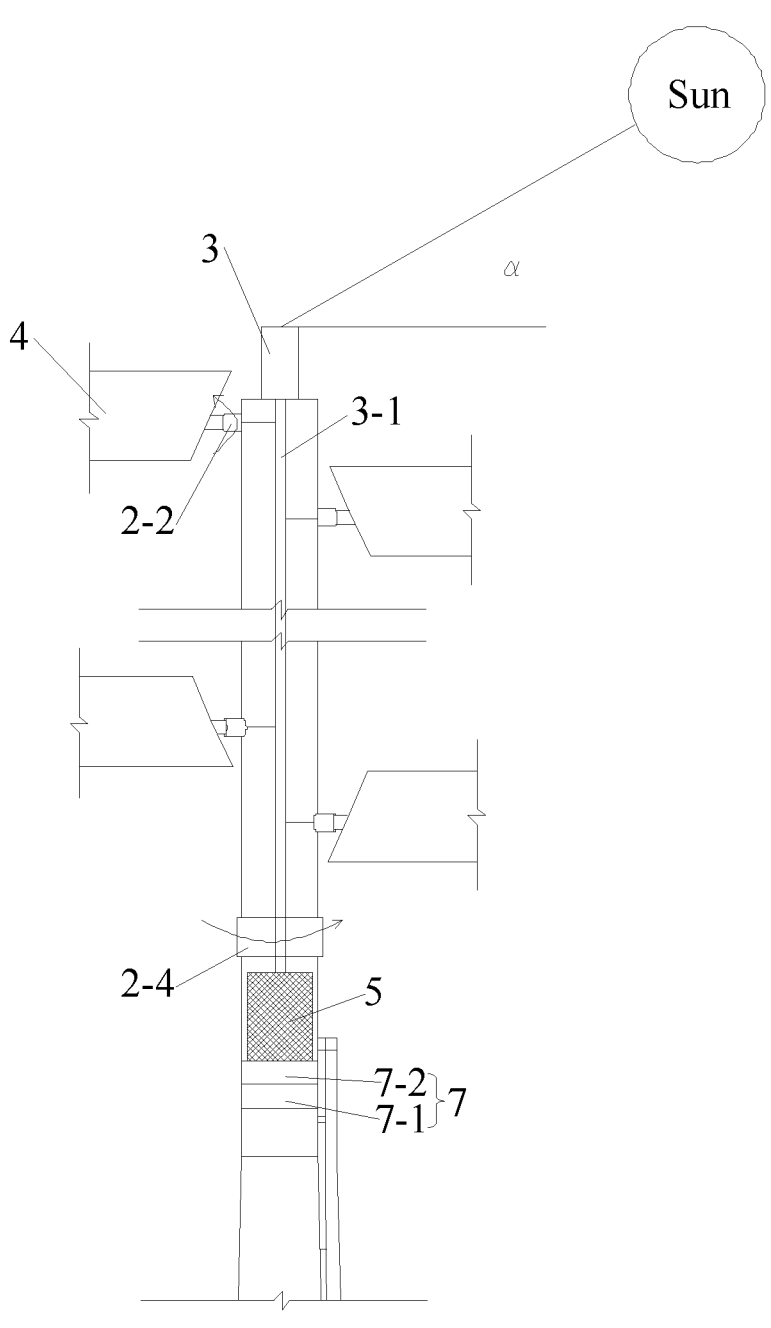
FIG. 3 schematically shows an internal arrangement of the multi-branch fixed offshore photovoltaic structure according to one embodiment of the present disclosure.

As shown in FIGS. 1-3, a multi-branch fixed offshore photovoltaic (PV) structure with automatic pitch adjustment includes a fixed base 1, a multi-branch integrated tower 2, a sunlight monitoring system 3, a PV device 4, and a control and energy storage system 5. The fixed base 1 includes an upper section 1-1, a middle section 1-2, and a lower section 1-3 connected in sequence. The lower section 1-3 of the fixed base 1 is arranged in the seabed, and the upper section 1-1 of the fixed base 1 is higher than the sea level and is connected to the multi-branch integrated tower 2 by a counter flange 7. The multi-branch integrated tower 2 includes a main tower body 2-1 and a plurality of pitch-regulating frames 2-2. The main tower body 2-1 is rotatably connected to the pitch-regulating frames 2-2. The main tower body 2-1 is provided with a control and energy storage system 5 for controlling the rotation of the pitch-regulating frames 2-2. The photovoltaic device 4 is fixed to the pitch-regulating frames 2-2. The main tower body 2-1 is provided with a sunlight monitoring system 3 for monitoring the solar orientation and the inclination angle of sunlight light relative to the main tower body 2-1. The sunlight monitoring system 3 is connected to the control and energy storage system 5. Through the cooperation of the sunlight monitoring system 3 and the control and energy storage system 5, the rotation of the pitch-regulating frames 2-2 and/or the main tower body 2-1 is controlled according to the solar orientation and the illumination angle, so that the PV device 4 receives sufficient illumination, thereby improving the power generation efficiency. Specifically, when the control and energy storage system 5 controls the main tower body 2-1 to perform axial rotation, the pitch-regulating frames 2-2 and the PV device 4 will change the orientations so that the PV device 4 can receive light easily. The control and energy storage system 5 controls the pitch-regulating frames 2-2 to perform axial rotation relative to the main tower body 2-1, so as to adjust directions of the PV device 4, so that the PV device 4 can better receive light.

As shown in FIG. 1, the main tower body 2-1 is connected to the upper section 1-1 of the fixed base 1 via the counter flange 7, and a plurality of pitch-regulating frames 2-2 are provided on the main tower body 2-1. A plurality of PV devices 4 are arranged at the pitch-regulating frames 2-2, which can improve the utilization rate of a single fixed base 1 and increase the power generation efficiency. The main tower body 2-1 plays a role as a structural backbone for support. The pitch-regulating frames 2-2 are configured for installation of the PV devices 4, and the pitch-regulating frames 2-2 are arranged along both sides of the main tower body 2-1.

The pitch-regulating frames 2-2 on different sides are staggered in the height direction. The pitch-regulating frames 2-2 on the same side are arranged in a fan-shaped pattern with the main tower body 2-1 as the axis. In other words, there is a certain angle between the vertical surfaces respectively passing through the pitch-regulating frames 2-2. In this embodiment, the angle between adjacent pitch-regulating frames 2-2 on the same side of the main tower body 2-1 is 5° in the vertical direction, ensuring that there is no interference between the PV panels. The pitch-regulating frames 2-2 can be provided with a main branch and a sub-branch according to the actual design requirements to enable the arrangement of more PV devices 4.

The fan-shaped pattern is specifically described below. Between the pitch-regulating frames 2-2 on the same side of the main tower body 2-1, there is an angle in the vertical direction between the pitch-regulating frames 2-2 at different heights with the main tower body 2-1 as the axis. Specifically, from the top to the bottom, the pitch-regulating frame 2-2 and next adjacent pitch-regulating frame 2-2 are staggered for 5°, to ensure that the upper pitch-regulating frame 2-2 will not block the lower pitch-regulating frame 2-2. In this embodiment, the pitch-regulating frames 2-2 on the same side are viewed from above, and each pitch-regulating frame 2-2 is angularly staggered in the same direction as the adjacent pitch-regulating frame 2-2. For example, the uppermost pitch-regulating frame 2-2 is staggered by 5 degrees with respect to the second pitch-regulating frame 2-2 below, and the uppermost pitch-regulating frame 2-2 is staggered by 10 degrees relative to the third pitch-regulating frame 2-2 below, and so on.

In this embodiment, the sunlight monitoring system 3 is a device in the prior art, commonly used in land-based photovoltaics, and only needs to has the functions of light sensing and feedback.

In this embodiment, the PV device 4 is a PV panel.

Figure 4:
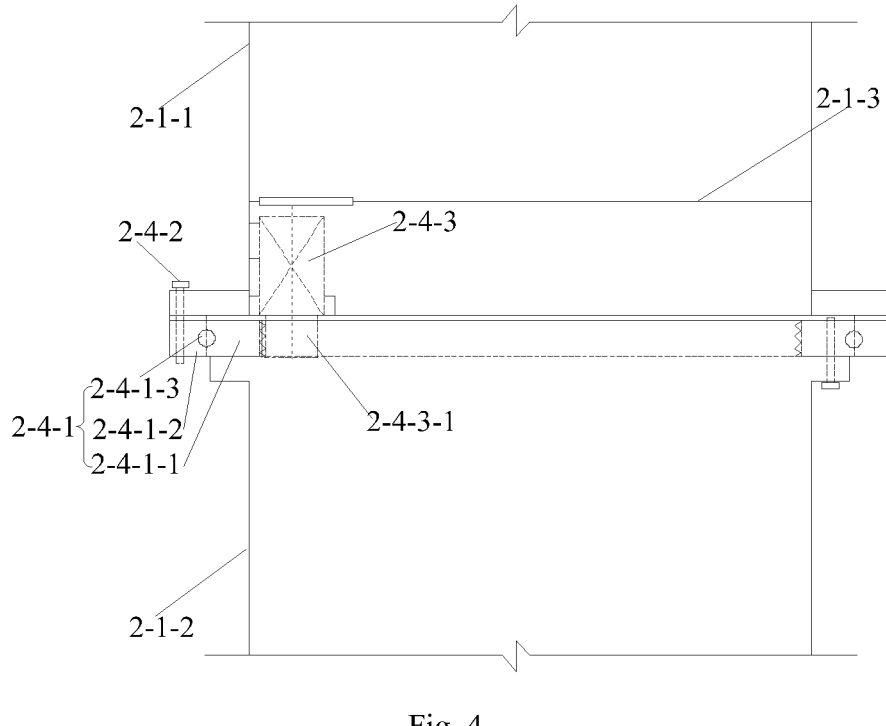
FIG. 4 is a schematic view of a rotating platform according to one embodiment of the present disclosure.

As shown in FIGS. 2 and 4, a fixed tower portion 2-1-2 is provided on the bottom of the main tower body 2-1, and a rotating tower portion 2-1-1 is provided on the top of the main tower body 2-1. The fixed tower portion 2-1-2 and the rotating tower portion 2-1-1 are connected by a rotating platform 2-4. Specifically, the angle of the main tower body 2-1 is adjusted according to the solar orientation and the light angle through the cooperation of the sunlight monitoring system 3 and the control and energy storage system 5, thereby simultaneously adjusting the angle of the rotating platform 2-4.

In this embodiment, each pitch-regulating frame 2-2 is rotatably provided at the outer periphery of the rotating tower portion 2-1-1 of the main tower body 2-1. Specifically, the axis of each pitch-regulating frame 2-2 is perpendicular to the axis of the rotating tower portion 2-1-1. The control and energy storage system 5 can control the of the individual pitch-regulating frame 2-2 to perform axial rotation relative to the rotating tower portion 2-1-1, so as to adjust the angle of the PV device 4 on the individual pitch-regulating frame 2-2.

In this embodiment, the sunlight monitoring system 3 is provided on top of the rotating tower portion 2-1-1 of the main tower body 2-1.

Figure 5:
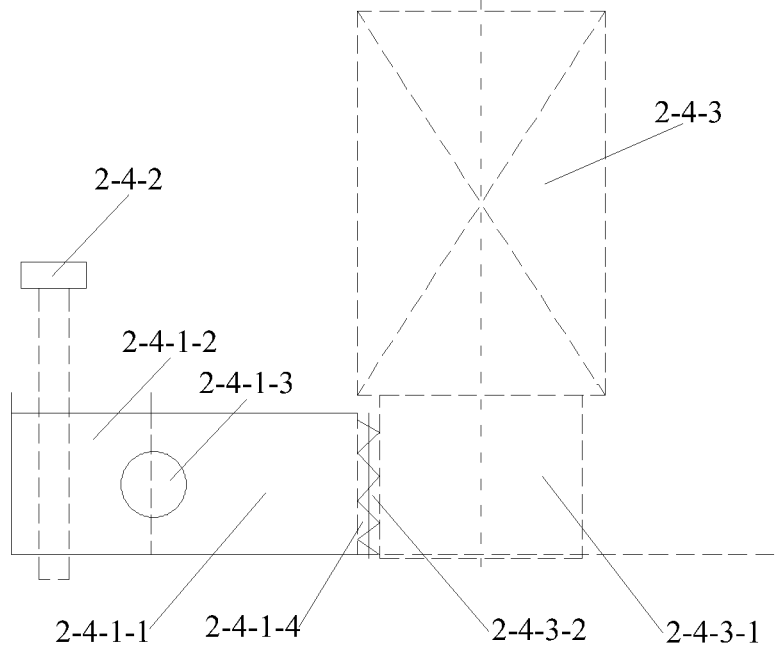
FIG. 5 schematically shows co-ordination between a rotating bearing and a rotating motor according to one embodiment of the present disclosure.

As shown in FIGS. 4 and 5, the rotating platform 2-4 includes a rotating bearing 2-4-1 and bolts 2-4-2. The rotating bearing 2-4-1 is a large ball bearing. The rotating bearing 2-4-1 includes an inner ring 2-4-1-1, an outer ring 2-4-1-2, and a ball rolling element 2-4-1-3 provided between the inner ring 2-4-1-1 and the outer ring 2-4-1-2. The outer ring 2-4-1-2 is connected to the rotating tower portion 2-1-1 by the bolt 2-4-2, and the inner ring 2-4-1-1 is connected to the fixed tower portion 2-1-2 by the bolt 2-4-2. The ball rolling element 2-4-1-3 is set between the inner ring 2-4-1-1 and the outer ring 2-4-1-2, so that the inner ring 2-4-1-1 and the outer ring 2-4-1-2 can rotate relative to each other. A rotating motor 2-4-3 is fixedly connected to the rotating tower portion 2-1-1. A first meshing tooth 2-4-3-2 is provided on the outer periphery of a rotating shaft 2-4-3-1 of the rotating motor 2-4-3. A second meshing tooth 2-4-1-4 is provided on an inner side of the inner ring 2-4-1-1. The rotating motor 2-4-3 is connected to the inner ring 2-4-1-1 through the engagement between the first meshing tooth 2-4-3-2 and the second meshing tooth 2-4-1-4. Thus, the rotating shaft of the rotating motor 2-4-3 rotates itself to simultaneously drive the rotating motor 2-4-3 to rotate along the inner ring 2-4-1-1 of the rotating bearing 2-4-1. Vertical loads, horizontal loads and tilting moments acting on the rotating tower portions 2-1-1 are transferred to the fixed tower portion 2-1-2 through the rotating bearing 2-4-1. Specifically, the rotating platform 2-4 enables the rotating tower portion 2-1-1 of the main tower body 2-1 to rotate by 180 degrees in the horizontal plane.

As shown in FIG. 4, the main tower body 2-1 also includes a first inner platform 2-1-3. The first inner platform 2-1-3 is fixedly disposed inside the rotating tower portion 2-1-1, and the rotating motor 2-4-3 is fixedly connected to the first inner platform 2-1-3. When the rotating motor 2-4-3 operates, the rotational force of the rotating shaft of the rotating motor 2-4-3 is gradually transferred to the rotating tower portion 2-1-1, the first inner platform 2-1-3, and the outer ring 2-4-1-2, which in turn drives the rotation of the rotating tower portion 2-1-1 relative to the inner ring 2-4-1-1 and the fixed tower portion 2-1-2.

Figure 6:
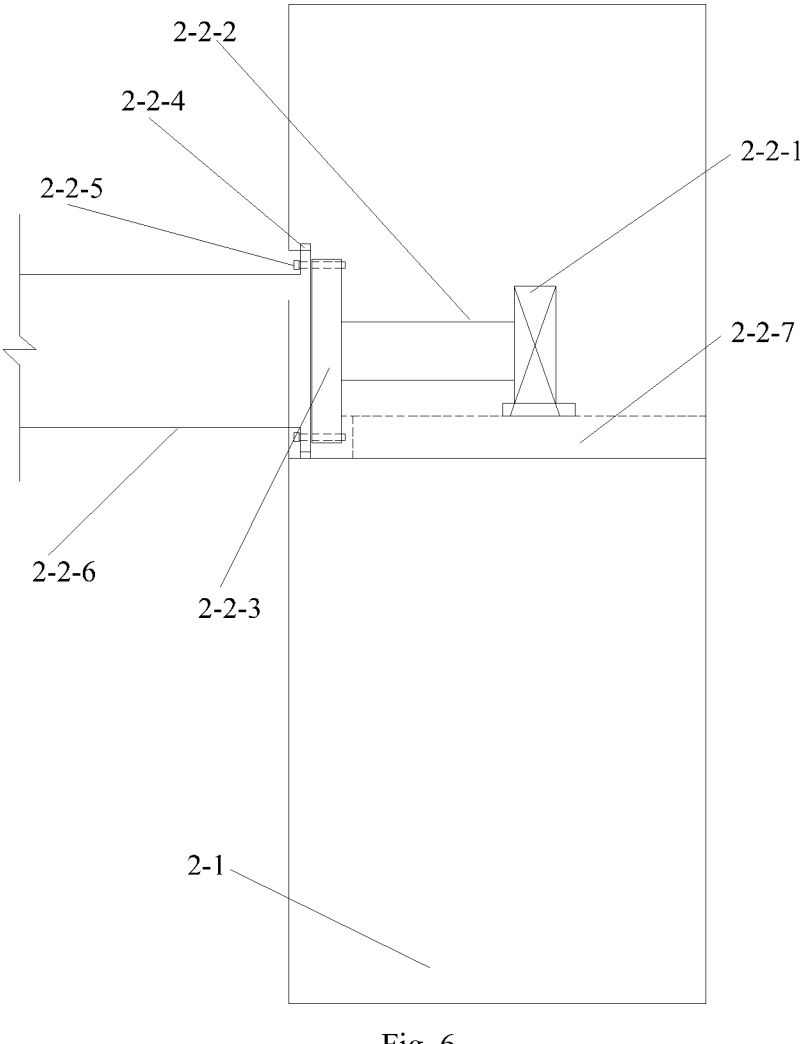
FIG. 6 is a schematic diagram of a pitch-regulating frame and an inner platform according to one embodiment of the present disclosure.

As shown in FIG. 6, the pitch-regulating frame 2-2 includes a bearing motor 2-2-1, a motor spindle 2-2-2, a spindle rotary plate 2-2-3, a support bearing 2-2-4, a connecting bolt 2-2-5, a main beam 2-2-6, and a second inner platform 2-2-7. The PV device 4 is fixedly disposed on the main beam 2-2-6. The bearing motor 2-2-1 drives the motor spindle 2-2-2 to rotate. The motor spindle 2-2-2 is connected to the main beam 2-2-6 through the spindle rotary plate 2-2-3, which in turn drives the pitch-regulating frame 2-2 to rotate, thereby adjusting the angle of the PV device 4. The bearing motor 2-2-1 is mounted on the second inner platform 2-2-7, and the spindle rotary plate 2-2-3 is connected to the main beam 2-2-6 through the connecting bolt 2-2-5. The support bearing 2-2-4 and the second inner platform 2-2-7 are both connected to the main tower body 2-1 as a rotation support surface and rotation track for the main beam 2-2-6. Specifically, the bearing motor 2-2-1 is provided to ultimately drive the main beam 2-2-6 to rotate, thereby realizing the pitch rotation of the pitch-regulating frame 2-2. In this embodiment, the rotation range of the pitch-regulating frame 2-2 is 0-90 degrees.

Figure 7:
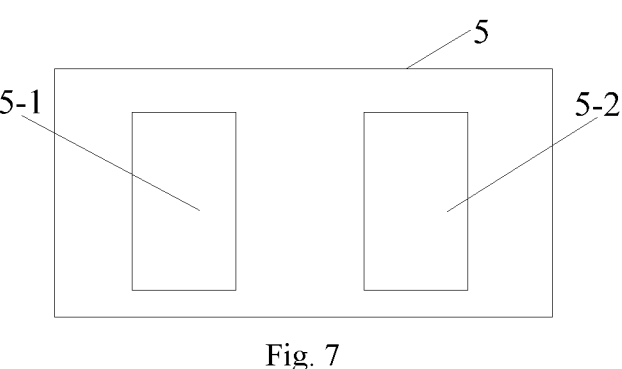
FIG. 7 is a schematic diagram of a control and energy storage system according to one embodiment of the present disclosure.

As shown in FIGS. 3 and 7, the control and energy storage system 5 includes a control unit 5-1 and an energy storage unit 5-2. The main equipment of the control and energy storage system 5 is installed inside the multi-branch integrated tower 2, which consumes a small amount of electricity, and achieves the power storage of the energy storage unit 5-2 by generation electricity of photovoltaic panels. The energy storage unit 5-2 supplies power to the control unit 5-1, the bearing motor 2-2-1 of the pitch-regulating frame 2-2, and the rotating motor 2-4-1 of the rotating platform 2-4 without an external power supply.

The sunlight monitoring system 3 is configured to monitor the solar orientation and the inclination angle of the sunlight relative to the pylon, and feed the monitoring results back to the control and energy storage system 5. The control unit sends out electrical signal commands to control the rotating platform 2-4 and the pitch-regulating frame 2-2 to adjust the orientation and the rotation angle in accordance with the incidence angle of the sunlight, so as to ensure that the photovoltaic panels receive sufficient light, thereby improving the efficiency of power generation. The control and energy storage system 5 is installed inside the main tower body 2-1. The power generated by the photovoltaic panels is completely collected inside the main tower body 2-1 via an inverter and output via a submarine cable.

As shown in FIGS. 1 and 2, the fixed base 1 includes the upper section 1-1, the lower section 1-3, and the middle section 1-2 between the upper section 1-1 and the lower section 1-3. The middle section 1-2 is a variable-diameter section with a circular cross-section. The radius of the cross-section of the middle section 1-2 gradually decreases from the end connecting the lower section 1-3 to the end connecting the upper section 1-1. Due to the requirements of the sea working conditions, the lower section 1-3 with a larger diameter needs to be inserted into the seabed to improve the connection firmness between the fixed base 1 and the seabed and the higher bearing capacity. Further, the upper section 1-1 with a smaller diameter can have a smaller wind-wave surface on the sea surface, which can better adapt to the sea working conditions to ensure the overall firmness. The fixed base 1 has a steel pipe pile structure with variable diameter. The diameter of the upper port of the steel pipe pile is small, and the diameter of the lower port is large. The diameter of the upper port is the same as the diameter of bottom of the fixed tower portion 2-1-2 at the top of the upper port. The upper port of the steel pipe pile is equipped with the counter flange to accurately connect to the bottom of the fixed tower portion 2-1-2. The diameter of the lower end of the steel pipe pile is designed according to the geological exploration data and foundation bearing capacity requirements. The middle section of the steel pipe pile is a variable-diameter section, so that the upper and lower ends of the steel pipe pile reasonably transition. When the steel pipe pile has sufficient bearing capacity, there is no need to arrange the variable-diameter section, i.e. the whole steel pipe pile is a round pipe of equal diameter.

The outer periphery of the fixed base 1 is coated with an anti-corrosion coating to achieve physical anti-corrosion. Or the middle section 1-2 of the fixed base 1 is provided with a sacrificial anode block 1-5, as shown in FIG. 1. Specifically, the physical anti-corrosion of the exposed part (splash zone and full immersion zone) of the steel structure of the steel pipe pile is achieved by long-life heavy-duty anti-corrosion coating. The electrochemical anti-corrosion is achieved by the sacrificial anode protection method or impressed current cathodic protection method.

The sacrificial anode block 1-5 is provided in the variable-diameter section of the fixed base 1 below the sea level. The electrochemical anti-corrosion of the fixed base 1 can be achieved by the sacrificial anode and impressed current protection method.

The PV device 4 is connected to an external power grid via a submarine cable 8. The power generated by the PV device 4 is transmitted to the external power grid via the submarine cable 8. The fixed base 1 below the sea level is provided with a protection sleeve 6, and the protection sleeve 6 is set outside the submarine cable 8. The PV device 4 generates electricity and transmits it through the submarine cable 8. The submarine cable 8 is provided in the protection sleeve 6 to resist wave, avoiding the front end of the submarine cable 8 into the fixed base 1 from being impacted by waves, thereby playing a fixing role.

The PV device 4 is used to send power into the power grid through the sea cable after filling the energy storage unit. Specifically, the PV device 4 gives priority to charging the energy storage unit.

As shown in FIGS. 1 and 2, a counter flange 7 is provided between the upper section 1-1 of the fixed base 1 and the multi-branch integrated tower 2. The counter flange 7 includes a first flange plate 7-1 and a second flange plate 7-2. The first flange plate 7-1 is fixedly connected to the upper section 1-1 of the fixed base 1, and the second flange plate 7-2 is fixedly connected to the fixed tower portion 2-1-2. The first flange plate 7-1 and the second flange plate 7-2 is fixedly connected by bolts, so as to realize the connection between the fixed tower portion 2-1-2 and the upper section 1-1 of the fixed base 1, which on the one hand facilitates the overall marine mounting and fixing, and on the other hand facilitates the maintenance and replacement of the multi-branch integrated tower 2. The fixed base 1 and the multi-branch integrated tower 2 are constructed separately. Moreover, the installation and debugging of the PV device 4 and the pitch-regulating frames on the multi-branch integrated tower 2 are completed in the processing plant yard. The installation is carried out by means of offshore piling and lifting of the superstructure. The superstructure is highly integrated, which can shorten the offshore operation and construction period, and improve the construction efficiency. The small lifting equipment is used for offshore transportation, thereby lifting the steel pipe piles and the multi-branch integrated tower 2 to the deck barge. Then, the lifting ship machine and small piling equipment are used for installing the structure in the designated sea area. The structure is small and light in weight without the need to deploy the large barge and lifting ship machine, which greatly reduces the cost and risk of the sea construction.

Described above are merely preferred embodiments of the disclosure, which are not intended to limit the disclosure. Any modifications and replacements made by those skilled in the art without departing from the spirit of the disclosure should fall within the scope of the disclosure defined by the present claims.

What is claimed is:

1. A multi-branch fixed offshore photovoltaic (PV) structure with automatic pitch adjustment, comprising:

a fixed base;

a multi-branch integrated tower;

a sunlight monitoring system;

a PV device; and a control and energy storage system;

wherein the fixed base comprises an upper section, a middle section, and a lower section connected in sequence; the lower section is configured for arrangement in a seabed; and an end of the upper section away from the middle section is connected to the multi-branch integrated tower through a counter flange;

the multi-branch integrated tower comprises a main tower body and a plurality of pitch-regulating frames; the plurality of pitch-regulating frames is rotatably provided on the main tower body; the main tower body comprises a rotating tower portion and a fixed tower portion; the rotating tower portion is rotatably provided on an upper portion of the fixed tower portion; the fixed tower portion is connected to the upper section of the fixed base through the counter flange;

the sunlight monitoring system is provided on the rotating tower portion for monitoring a solar orientation and an inclination angle of sunlight relative to the main tower body;

each of the plurality of pitch-regulating frames is fixedly provided with the PV device; the PV device is integrated with a light-sensing device, and the light-sensing device is configured to monitor an illumination area and an illumination intensity on the PV device;

the control and energy storage system is provided in the fixed tower portion; the main tower body, the plurality of pitch-regulating frames, the sunlight monitoring system, and the light-sensing device are all in signal connection with the control and energy storage system; the control and energy storage system is in wire or wireless communication with the sunlight monitoring system and the light-sensing device for data transmission; and the control and energy storage system is configured to control the rotating tower portion to perform axial rotation relative to the fixed tower portion, and to control each of the plurality of pitch-regulating frames to rotate relative to the main tower body, so as to adjust an angle of the PV device;

each of the plurality of pitch-regulating frames comprises a bearing motor, a spindle rotary plate, and a main beam; and the bearing motor is provided with a motor spindle which is connected to the spindle rotary plate; the spindle rotary plate is connected to the main beam; the PV device is fixedly provided on the main beam; the bearing motor is in signal connection with the control and energy storage system; and the control and energy storage system is configured to control the motor spindle of the bearing motor to rotate, so as to make the spindle rotary plate drive the main beam to rotate relative to the fixed tower portion, thereby adjusting the angle of the PV device.

2. The multi-branch fixed offshore PV structure of claim 1, wherein each of the plurality of pitch-regulating frames further comprises a support bearing, a connecting bolt, and an inner platform; the bearing motor is mounted on the inner platform; the spindle rotary plate is connected to the main beam through the connecting bolt; and both the support bearing and the inner platform are connected to the main tower body.

3. The multi-branch fixed offshore PV structure of claim 1, wherein the middle section is a variable-diameter section; a cross-section of the middle section is circular; and a radius of the cross-section of the middle section decreases progressively from an end of the middle section connected with the lower section to an end of the middle section connected with the upper section.

4. The multi-branch fixed offshore PV structure of claim 1, wherein the middle section is provided with a sacrificial anode block, or an outer periphery of the fixed base is coated with an anti-corrosion coating.

5. The multi-branch fixed offshore PV structure of claim 1, wherein the PV device is connected to an external power grid via a submarine cable; the PV device is configured to generate and transmit electricity to the external power grid via the submarine cable; and the submarine cable is sleevedly provided with a protection sleeve.

6. The multi-branch fixed offshore PV structure of claim 1, wherein the counter flange comprises a first flange plate and a second flange plate; the first flange plate is fixedly connected to the upper section; the second flange plate is fixedly connected to the fixed tower portion; the first flange plate is connected to the second flange plate, so as to connect the fixed tower portion to the upper section.

7. The multi-branch fixed offshore PV structure of claim 1, wherein the main tower body further comprises a rotating platform through which the rotating tower portion is connected to the fixed tower portion; and the rotating platform comprises a rotating bearing, a first bolt and a second bolt; the rotating bearing comprises an inner ring, an outer ring, and a ball rolling element provided between the inner ring and the outer ring; the ball rolling element is configured to enable relative rotation between the inner ring and the outer ring; the outer ring is connected to the rotating tower portion through the first bolt; the inner ring is connected to the fixed tower portion through the second bolt, so as to realize a rotational connection between the rotating tower portion and the fixed tower portion.

8. The multi-branch fixed offshore PV structure of claim 7, wherein the control and energy storage system is provided in the main tower body; the rotating platform further comprises a rotating motor which is fixedly connected to the rotating tower portion; a first meshing tooth is provided on an outer periphery of a rotating shaft of the rotating motor; a second meshing tooth is provided on an inner side of the inner ring; the rotating motor is engaged with the inner ring through the first meshing tooth and the second meshing tooth to drive the rotating shaft of the rotating motor to rotate, so as to drive the rotating tower portion to rotate relative to the fixed tower portion; and the control and energy storage system is in signal connection with the rotating motor to control the rotating motor to rotate.

9. The multi-branch fixed offshore PV structure of claim 8, wherein the control and energy storage system comprises a control unit and an energy storage unit; the rotating motor, each of the plurality of pitch-regulating frames, the sunlight monitoring system, and the light-sensing device are in signal connection with the control unit; the PV device is electrically connected to the energy storage unit; the PV device is configured to charge the energy storage unit; and the energy storage unit is configured to power the control unit, the rotating motor and the plurality of pitch-regulating frames.

10. The multi-branch fixed offshore PV structure of claim 9, wherein the PV device is configured to send power to a power grid through a submarine cable after the energy storage unit is fully charged.

* * * * *